United States Patent
Waltisperger et al.

(10) Patent No.: US 8,937,402 B2
(45) Date of Patent: Jan. 20, 2015

(54) CONVERTER CIRCUIT AND ELECTRONIC SYSTEM COMPRISING SUCH A CIRCUIT

(75) Inventors: Guy Waltisperger, Grenoble (FR);
Adrien Ramond, Moissac (FR);
Frederic Rothan, Seyssinet-Pariset (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 341 days.

(21) Appl. No.: 13/293,206

(22) Filed: Nov. 10, 2011

(65) Prior Publication Data
US 2012/0104852 A1    May 3, 2012

Related U.S. Application Data

(63) Continuation of application No. PCT/EP2010/056579, filed on May 12, 2010.

(30) Foreign Application Priority Data

May 14, 2009 (FR) ..................... 09 02334

(51) Int. Cl.
*H02J 1/00* (2006.01)
*H02M 3/158* (2006.01)
*H02M 1/00* (2006.01)

(52) U.S. Cl.
CPC ...... *H02M 3/158* (2013.01); *H02M 2001/0022* (2013.01); *H02M 2001/009* (2013.01)
USPC .......................................................... 307/39

(58) Field of Classification Search
USPC ............................................................ 307/39
See application file for complete search history.

(56) References Cited

U.S. PATENT DOCUMENTS

| | | | |
|---|---|---|---|
| 6,061,577 A | 5/2000 | Andrieu et al. | |
| 6,175,512 B1 * | 1/2001 | Hagihara et al. | 363/71 |
| 7,088,595 B2 * | 8/2006 | Nino | 363/17 |
| 7,663,342 B2 * | 2/2010 | Kimball et al. | 320/132 |
| 7,859,241 B2 * | 12/2010 | Yoshida et al. | 323/285 |

(Continued)

FOREIGN PATENT DOCUMENTS

| | | |
|---|---|---|
| EP | 1 564 822 | 8/2005 |
| FR | 2686434 | 7/1993 |

(Continued)

*Primary Examiner* — Rexford Barnie
*Assistant Examiner* — Daniel Kessie
(74) *Attorney, Agent, or Firm* — Occhiuti & Rohlicek LLP (57) ABSTRACT

A converter circuit to be connected to an electrical energy source includes a chopper circuit having an input terminal capable of being connected to said electrical energy source, a first output circuit adapted to being connected via a first switch to an output terminal of the chopper circuit, a second output circuit adapted to being connected via a second switch to the output terminal of the chopper circuit, and a control circuit. The control circuit is adapted for controlling the duty cycle of the chopper circuit as a function of the variation in voltage of said electrical energy source, and switching between the first and second switches as a function of a range of output voltage settings for the first output circuit.

21 Claims, 6 Drawing Sheets

(56) References Cited

U.S. PATENT DOCUMENTS

| | | | |
|---|---|---|---|
| 2005/0008861 A1 | 1/2005 | Yadav et al. | |
| 2006/0174939 A1* | 8/2006 | Matan | 136/293 |
| 2006/0238241 A1* | 10/2006 | Pearce et al. | 330/10 |
| 2007/0223255 A1 | 9/2007 | Condemine et al. | |
| 2007/0281755 A1* | 12/2007 | Dwelley | 455/572 |
| 2008/0149167 A1 | 6/2008 | Liu | |
| 2008/0150436 A1* | 6/2008 | Suzuki | 315/169.3 |
| 2009/0078300 A1* | 3/2009 | Ang et al. | 136/244 |
| 2010/0327659 A1* | 12/2010 | Lisi et al. | 307/82 |
| 2011/0026283 A1* | 2/2011 | Okada | 363/74 |

FOREIGN PATENT DOCUMENTS

| | | |
|---|---|---|
| JP | 8-237939 | 9/1996 |
| JP | 2005-117886 | 4/2005 |
| JP | 2005-137175 | 5/2005 |
| JP | 2005-237058 | 9/2005 |
| JP | 2008-507247 | 3/2008 |
| WO | 2008/154031 | 12/2008 |

\* cited by examiner

CONVERTER CIRCUIT AND ELECTRONIC SYSTEM COMPRISING SUCH A CIRCUIT

RELATED APPLICATIONS

Under 35 USC 120, this application is a continuation application that claims the benefit of the priority data of International Application No. PCT/EP2010/056579, filed May 12, 2010, which in turn claims the benefit of the priority date, under 35 USC §119, of French Application No. 0902334, filed May 14, 2009. The entire content of both of the forgoing applications is incorporated herein by reference.

FIELD OF DISCLOSURE

The present invention relates to a converter circuit and to an electronic system comprising such a circuit.

BACKGROUND

The development of photovoltaic panels has soared in recent years, with a view to making increasing use of renewable energy sources in order to reduce the harmful greenhouse effect caused especially by carbon dioxide emission.

This is the case also for renewable energy sources such as wind-power generators or thermoelectric sources.

These energy sources have the particular feature in which the electrical energy that they provide varies greatly as a function of natural phenomena feeding them. A photovoltaic generator is a generator whose characteristic curve $I=f(U)$ is highly non-linear. Thus, for a same value of illumination, the power delivered will be different depending on the load.

Thus, the efficiency, i.e. the delivered power of a photovoltaic cell, depends not only on its exposure to the sun which varies during the day but also on the concealment of the sun, for example by the shadows thrown by clouds or other weather phenomena.

Besides, when these cells are connected to a load such as a consumer (for example a sensor or else a battery to be recharged), it turns out that the power transferred to the load generally does not correspond to the maximum power that could be delivered by the cell. Similar problems are seen in the case of wind-generated power. As a result, is that efficiency drops not only for example because there is less sunlight but because this efficiency is further reduced by an imposed operating point situated below the potential performance characteristics of the cell.

In order to overcome this drawback and produce energy that is always as close as possible to the optimal operating power point, circuits implementing a method known as the Maximum Power Point Tracking (MPPT) method have been developed since 1968. It consists in providing a better connection between a non-linear source and an arbitrary load.

These circuits are designed to force the generator, such as the photovoltaic cell, to work at its maximum power point, thus giving rise to improved efficiency.

An MPPT controller therefore makes it possible to drive the static converter connecting the load (a battery for example) and the photovoltaic panel so that the load is permanently provided with maximum power.

There is a known method based on a "perturbation and observation" method that is applied when tracking the maximum power point (MPP).

In the case of a photovoltaic application, this is actually an algorithm which, for a fixed voltage U1, will measure the corresponding power P1 delivered by the generator. Then, after a certain period of time, the algorithm dictates a voltage $U2=U1+\Delta U$ and also measures the corresponding power P2. Subsequently, a voltage $U3=U2+\Delta U$ is dictated if P2 is greater than P1 or, if not, a voltage $U3=U2-\Delta U$.

However, this implies measurements of current and also substantial computation resources, the energy consumption of which is non-negligible. This is why, in a large-sized photovoltaic installation, a sub-group of cells is dedicated exclusively to providing the energy needed to control the MPPT circuit.

However, in electronic micro-systems such as for example autonomous sensors, this approach is not acceptable because the constraints in terms of space requirement and weight are great and it is necessary to have the smallest possible system with increased autonomy.

There also exist known maximum power point tracking circuits that possess an additional driving cell, and this is not always desirable.

There also exist known MPPT circuits without driving cells, based on open-circuit voltage sampling. This sampling is done by disconnecting the photovoltaic panel at fixed frequency from the rest of the circuit to measure the voltage in an open circuit. The system then reconnects the panel to the harvesting circuit which has taken the new optimized parameters into account. However, this results in frequent interruptions of the energy harvesting process, and this is not permissible for electronic micro-systems designed to be autonomous.

SUMMARY

The present invention seeks to overcome these above-mentioned drawbacks, at least in part.

According to one aspect, the invention seeks to optimize energy harvesting while at the same time substantially reducing the amount of space occupied by the system, especially the size of the generator, for example the photovoltaic or wind-power generator, as well as the back-up accumulator, for example a battery or super-capacitor.

To this end, the present invention proposes a converter circuit to be connected to an electrical energy source capable of major fluctuations, including:
   a chopper circuit comprising an input terminal capable of being connected to said electrical energy source,
      a first output circuit adapted to being connected via a first switch to an output terminal of the chopper circuit,
      a second output circuit adapted to being connected via a second switch to the output terminal of the chopper circuit,
   a control circuit adapted to controlling on one hand the duty cycle of the chopper circuit as a function of the variation in voltage of said electrical energy source, and on the other hand the switching over of the first and second switches as a function of a range of output voltage settings for the first output circuit.

According to one or more features of the converter circuit, taken alone or in combination:
   the first output circuit is to be connected to an electrical load working in a range of voltage settings and the second output circuit is to be connected to an electrical energy accumulator,
   the control circuit comprises a comparator with hysteresis having one input connected to the first output circuit and its other input connected to a reference, the output of the comparator being connected to an input of a control unit controlling a control generator which two outputs are respectively connected to the first and second switches for driving them respectively, the electrical energy accumulator is a rechargeable microbattery, the electrical energy accumulator is a super-capacitor, the output circuits include low-pass filters, the control circuit furthermore has means to:

determine the voltage at the outputs of said electrical energy source for two different duty cycles of a predefined quantity, compute the difference between the voltages obtained for two different duty cycles of a predefined quantity, compare this difference in voltage with a previously obtained value of voltage difference, and activate a change in the duty cycle by a quantity predefined as a function of the result of comparison, the control circuit is configured to activate an increase in the duty cycle by a predefined quantity if a previous decrease of the duty cycle has resulted in a decrease of the difference in voltage relatively to that obtained during the previous determining operation, the control circuit is configured to activate a decrease of the duty cycle by a predefined quantity if a previous increase in the duty cycle has resulted in a decrease of the difference in voltage relatively to that obtained during the preceding determining operation, the chopper circuit includes an electrical energy accumulation inductor and at least one chopping switch controlled by the control circuit, the electrical energy accumulation inductor and the chopping switch are positioned in a voltage boost configuration, the electrical energy accumulation inductor and two chopping switches are positioned in a voltage buck configuration, the electrical energy accumulation inductor and three chopping switches are positioned in a voltage buck/boost configuration, the control circuit has a sensor of "zero" current of the electrical energy accumulation inductor to trigger the activation of at least one switch.

An object of the invention is also an electronic system comprising at least one electrical energy source capable of major fluctuations and at least one converter circuit as defined here above connected to said at least one energy source.

According to one or more characteristics of the electronic system, taken alone or in combination, said source comprises at least one photovoltaic cell, said source comprises at least one wind-power generator, said source comprises at least one thermo-electrical element, the output of each energy source is connected to the input of an associated convertor circuit and each of the second output circuits of the converter circuit comprises a super-capacitor.

Other advantages and characteristics will appear upon reading the description of the invention as well as from the following figures of which:

BRIEF DESCRIPTION OF THE FIGURES

In all the figures, the identical elements carry the same reference numbers.

DETAILED DESCRIPTION

Figure 1:
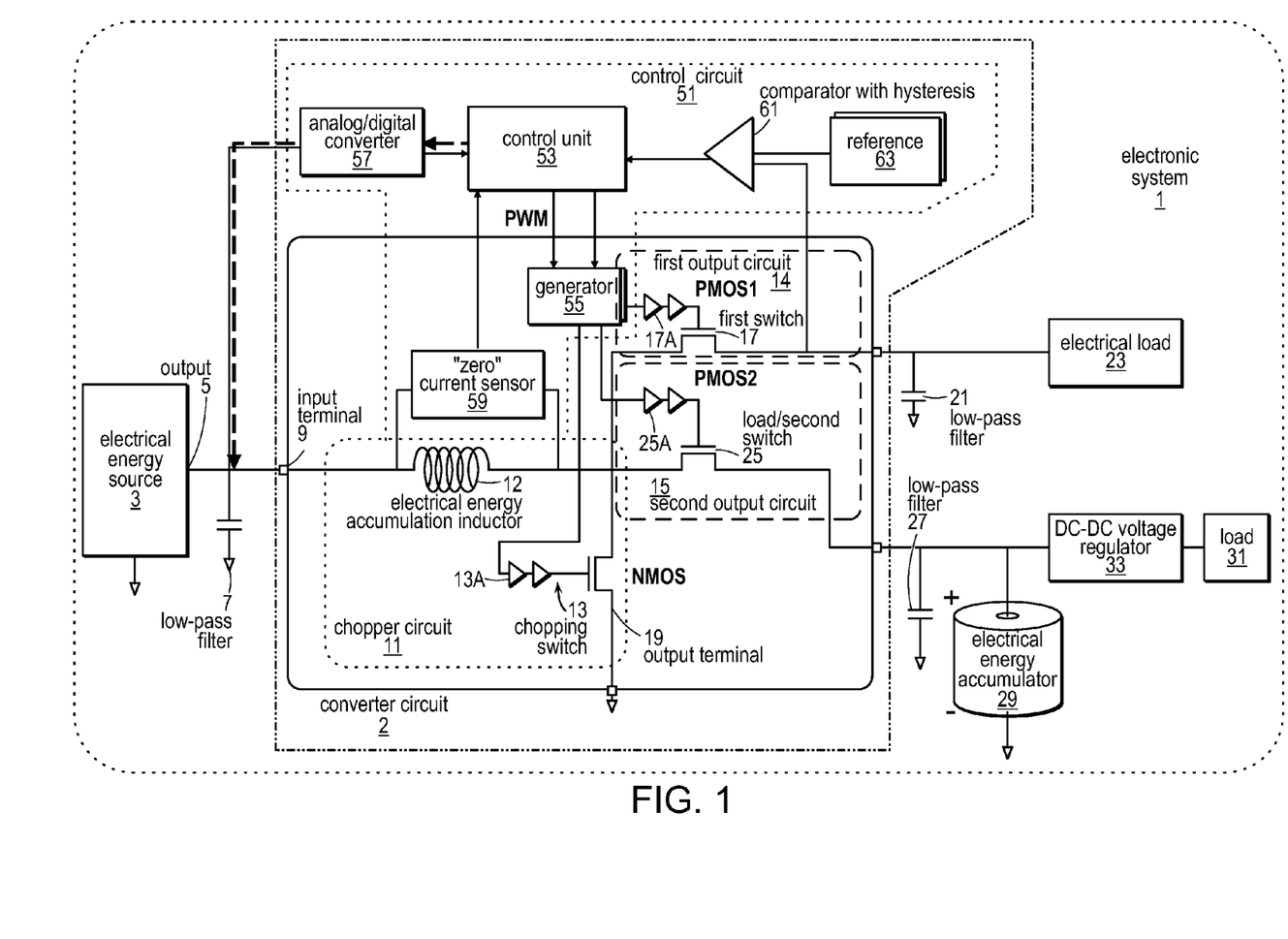
FIG. 1 is a diagram of an electronic system with a converter circuit according to a first embodiment.

FIG. 1 presents an example of a drawing of an electronic system 1 comprising a converter circuit 2 and an electrical energy source 3 connected to the circuit 2.

As far as the electrical energy source 3 capable of major fluctuations is concerned, it is for example a solar cell or panel, a thermo-electrical element or else a wind-power generator, in particular a small-sized generator.

The term "major fluctuations" is understood to mean fluctuations by about a factor of 100 between the lowest power and the highest power capable of being delivered by such a source 3.

An output 5 of this source 3 is connected through a low-pass filter 7, formed by a capacitor, to an input terminal 9 of the converter circuit 2.

The converter circuit 2 comprises a chopper circuit 11, the input terminal of which forms the input terminal 9 of the converter circuit 2 connected to said electrical energy source 3.

The chopper circuit 11 comprises on one hand an electrical energy accumulation inductor 12 and at least one chopping switch 13.

In FIG. 1, the electrical energy accumulator inductor 12 and the chopping switch 13 are positioned in a voltage boost configuration i.e. the input of the inductor is connected to the source 3 and the output of the inductor 12 can be connected to ground if the switch 13 is in the "on" state to enable a magnetic field to be set up about the inductor 12. The chopping frequency is for example 200 kHz.

The converter circuit further comprises the first output circuit 14 and a second output circuit 15.

Upstream, the first output circuit 13 is connected via a first switch 17 to an output terminal 19 of the chopper circuit 11.

Downstream, this first output circuit 13 is connected via a low-pass filter 21 to an electrical load 23 belonging to the electronic system 1 and working in a predefined range of voltage settings.

Upstream, the second output circuit 15 is connected via a second switch 25 to the output terminal 19 of the chopper circuit 11.

Downstream, the second output circuit 15 is connected via a low-pass filter 27 to an electrical energy accumulator 29 belonging to the electronic system 1.

This accumulator 29 may be a capacitor, a super-capacitor, a battery, a micro sized battery or a mini-battery.

As shown in FIG. 1, in order to enable a controlled power supply to an electrical load 31 downstream from the electrical accumulator 29, it is possible to provide a DC-DC voltage regulator 33.

If the electrical energy accumulator 29 is a battery, a micro sized or a mini-battery, it is planned to provide a charging circuit between the low-pass filter 27 and the accumulator 29 to enable the charging of the battery depending on the conditions associated with the technology of the battery in order to prevent any heating and/or any premature deterioration.

According to a first variant, the load 31 and the load 25 are identical. In this case, the electrical energy accumulator 29 is used for example to supply the load 25 when the energy produced by the source 3 is not sufficient for a direct supply to the load 25. In the case of a photovoltaic cell used as an electrical energy source 3, this may be the case for example at night when the sunlight is too weak, as for example in the case of cloudy skies.

According to a second variant, the loads 25 and 31 are different and correspond to different electrical consumers.

The driving of the converter circuit 2 is provided by a control circuit 51.

This control circuit 51 has a control unit 53 controlling on one hand the duty cycle α of the chopper circuit 11 and on the other hand the switching over of the first 17 and second 25 switches as shall be described in detail here below.

To this end, the control unit 53 has a PWM (pulse-width modulation) output controlling a generator 55 for controlling the switches 13, 17 and 25 (also called a DTLC dead time logic control) unit.

With respect to the switch 13, it must be noted that it is an NMOS type transistor which base is connected via buffers (also called delay lines) 13A to the output of the generator 55.

The switches 17 and 25 consist of PMOS transistors which bases are connected respectively through buffers 17A and 25A to associated outputs of the generator 55.

The control circuit 51 furthermore comprises means to determine the voltage at the terminals of said electrical energy source at two successive instants. To this end, the invention uses an analog/digital converter 57 having one input connected to the terminal 5 and one output connected to the corresponding input of the control unit 53.

For the control in particular of the switch 17 and 25, the control circuit 51 comprises a "zero" current sensor 59 to determine the cancellation of the current through the accumulation inductor 12, this sensor 59 delivering a signal to a corresponding input of the control unit 53.

According to one variant which has not been shown, it is possible to envisage replacing the "zero" current sensor with a diode having a very low threshold voltage, parallel-mounted with a switch.

For the control of the switches 17 and 25, the open or closed state of which determines whether the output 19 of the chopper circuit 11 is directly connected to the load 25 or to the electrical energy accumulator 29, the control circuit 51 comprises a comparator with hysteresis 61 having its input connected to the first output circuit 14 and its other input connected to a reference 63, the output of the comparator 61 being connected to an input of the control unit 53.

For the operation, the control unit 53 controls the generator 55 so that:
  when the switch 13 is closed (on state), the switches 17 and 25 are open (being off—blocking status),
  when one of the switches 17 or 25 is closed (in the on state), the other switch 25 or 17 is always open (in the off state) and the switch 13 is open (in the off state).

Thus, at a given point in time, only one of the switches 13, 17 or 25 can be in the closed state while the others will be in the open state.

Here below, the working of the converter circuit 2 of FIG. 1 shall be described in detail.

In order to make the source 3 always work around the maximum power point MPP, the inventors of the present invention have noted that the derivative of the operating voltage of the source 3 as a function of the duty cycle has a maximum around the maximum power point MPP. The result of this is that tracking the maximum of this voltage derivative is equivalent to tracking the maximum power point.

Thus, as shall be seen, through simple measurements of voltages and operations of subtraction and comparison that consume very little energy and computation power, it is possible to make the convertor circuit 2 work around the maximum power point MPP, which is very advantageous if little power is available.

To this end, the control unit 53 controls the duty cycle α of the chopper circuit 11 as a function of the voltage variation (the derivative as a function of the duty cycle) of said electrical energy source:
  by determining the voltage at the terminals of said electrical energy source for two different duty cycles of a predefined quantity,
  by computing the difference between the voltages obtained for two different duty cycles of a predefined quantity,
  by comparing this voltage difference with a value of voltage difference obtained previously, and
  by activating a change in duty cycle by a predefined quantity as a function of the result of the comparison.

Figure 2:
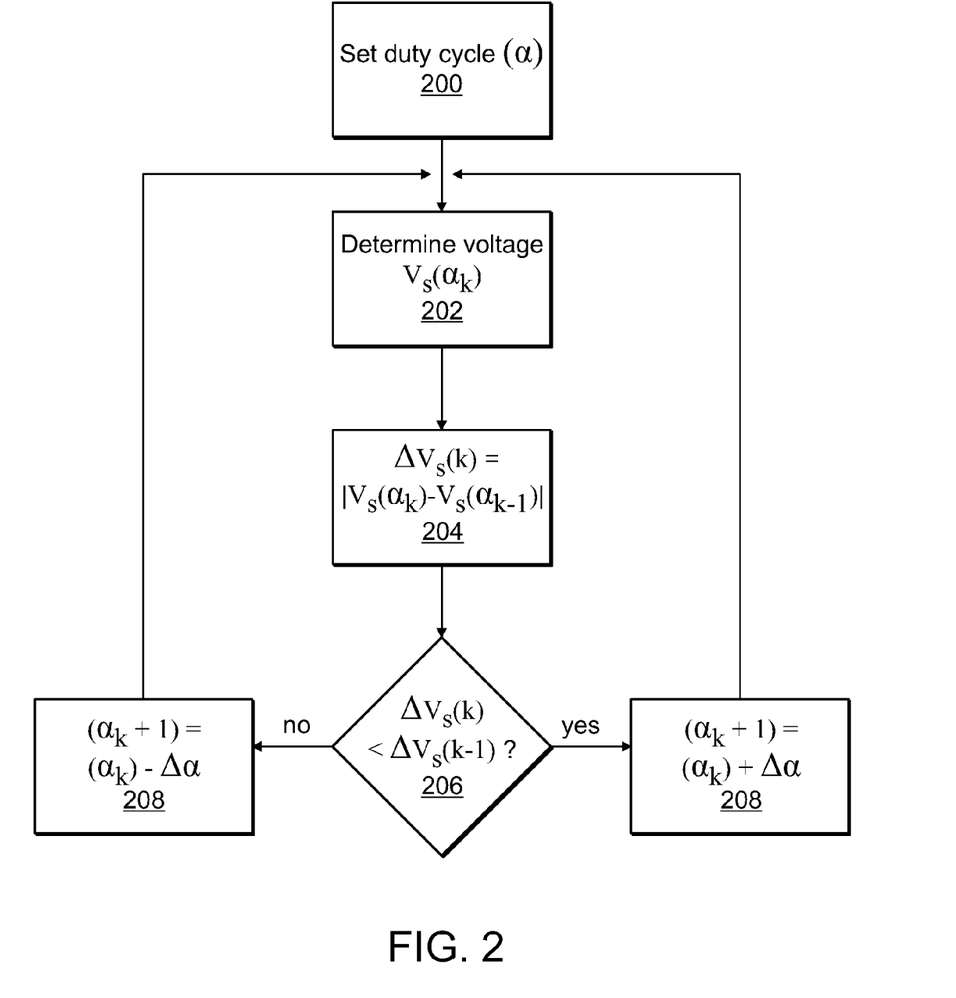
FIG. 2 is a flowchart for illustrating the maximum power point tracking method.

These different steps are shown in detail in FIG. 2.

During a setting step 200, the value of the duty cycle α is set at a predefined value for example α=0.5 and the voltage $V_S(\alpha)$ at the terminals of the source 3 is determined.

Then, the duty cycle is varied by a predefined quantity Δα, and the voltage $V_S(\alpha+\Delta\alpha)$ is determined again at the terminals of said electrical energy source 3.

Then, the absolute value of the difference between these two voltages is computed:

$$\Delta V^{ini}_S = |V_S(\alpha) - V_S(\alpha+\Delta\alpha)|$$

As a variant it is also possible to fix $\Delta V^{ini}_S$ at a predefined value.

Then, the tuning-by-recurrence loop as such starts.

At a step 202, for a loop k (k being an integer), the voltage $V_S(\alpha_k)$ is determined at the terminals of the source 3.

At a step 204, the absolute value of the difference between the two voltages measured for the loop k and k−1 is computed:

$$\Delta V_S(k) = |V_S(\alpha_k) - V_S(\alpha_{k-1})|; \text{ where } |(\alpha_k)-(\alpha_{k-1})|=\Delta\alpha$$

Then, at a step 206, this voltage difference $\Delta V_S(k)$ is compared with a previously obtained value of voltage difference: $\Delta V_S(k-1)$.

Depending on the result of the comparison, the control unit 53 activates the change in the duty cycle by a predefined quantity Δα during the step 208.

Thus, the control circuit 51 is configured to activate an increase in the duty cycle by the predefined quantity Δα if the previous reduction of the duty cycle has resulted in a decrease of the difference in voltage relatively to that obtained during the previous determining operation.

In other words, if $(\alpha_k)=(\alpha_{k-1})-\Delta\alpha$ and if $\Delta V_S(k)<\Delta V_S(k-1)$, then $(\alpha_{k+1})=(\alpha_k)+\Delta\alpha$.

If not, the control circuit 51 is configured to activate a decrease of the duty cycle by a predefined quantity Δα if a previous increase in the duty cycle has resulted in a diminishing of the difference in voltage relatively to that obtained during the previous determining operation.

In other words, if $(\alpha_k)=(\alpha_{k-1})+\Delta\alpha$ and if $\Delta V_S(k)<\Delta V_S(k-1)$, then $(\alpha_{k+1})=(\alpha_k)-\Delta\alpha$.

After the step 208, the operation returns to the step 202.

Thus, the convertor circuit oscillates about the maximum power point MPP, thus guaranteeing the harvesting of a maximum amount of power available at the source.

The maximum power point MPP tracking frequency or duty cycle refresh frequency, i.e. the frequency of performance of the steps 202 to 208 is of the order of about 10 Hz, for example 16 Hz.

It is furthermore noted that the smaller the value of Δα, the closer to the optimum maximum power point will the circuit be capable of operating. In this case, a higher refresh frequency will be chosen in order to enable faster adapting of the duty cycle to a change in operating conditions.

As stated here above, when the switch 13 is closed, the switches 17 and 25 are open and the inductor is crossed by a current provided by the source 3 setting up a magnetic field.

Then, the switch 13 is open and the electrical power can be provided either directly to the load 25 for direct consumption by opening the switch 17 or stored in the accumulator 29 for subsequent consumption.

The output circuit 14 therefore works together with the chopper circuit 11 as a voltage regulator.

Thus, when the switch 13 is open, the switch 17 opens if the output voltage is included in a range of output voltage settings.

This range of settings is defined by means of the comparator with hysteresis 61 and the reference 63.

When the output voltage is outside the range of set values, the control unit 53 receives a corresponding signal from the comparator 61 and activates the opening of the switch 25 if the switch 13 is still open.

Thus, the electrical energy generated by the source 3 can be harvested optimally either for direct consumption of the load 25 or to charge the accumulator 29.

Figure 3:
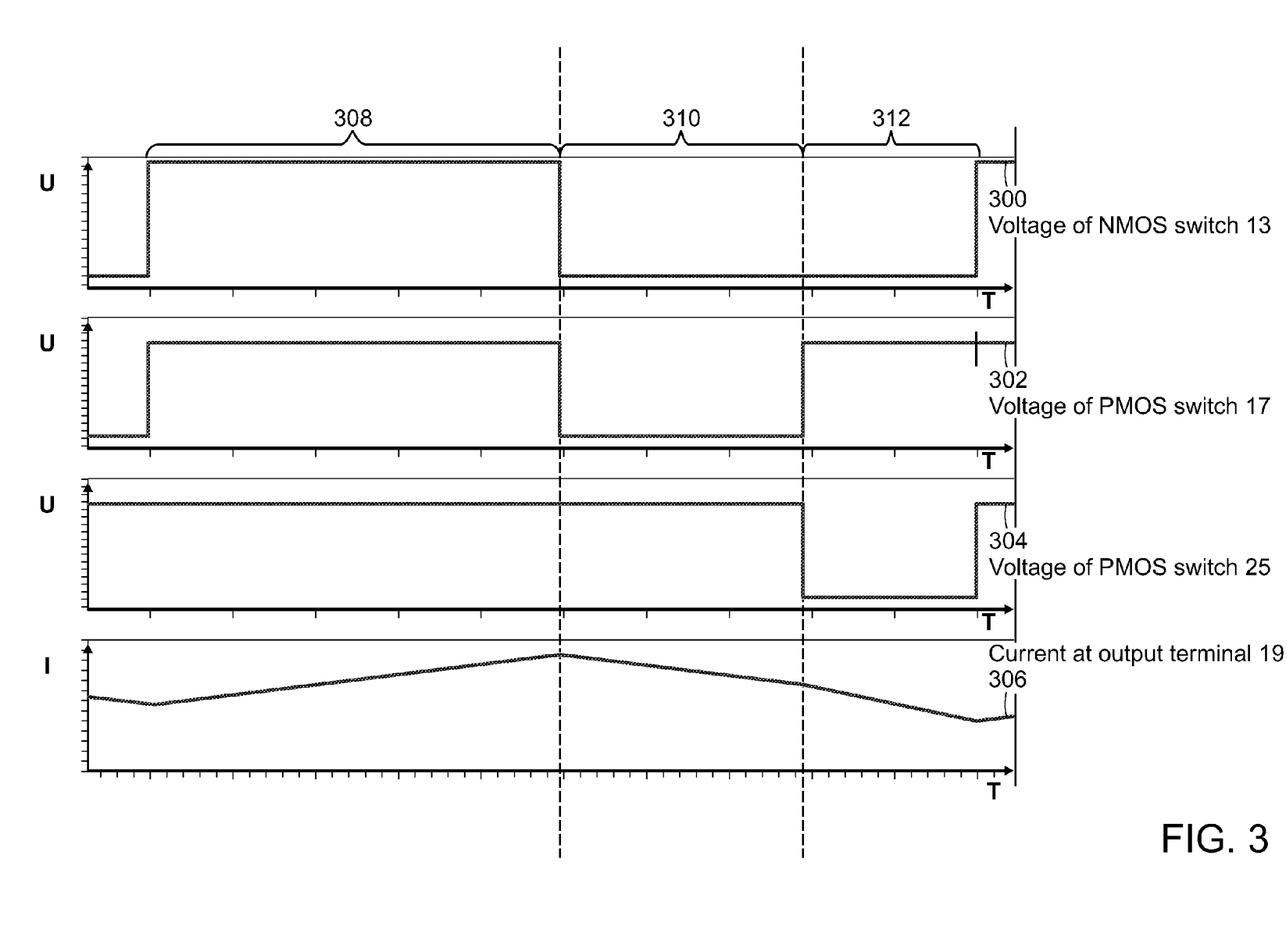
FIG. 3 is a schematic graph of the controls of the transistors of the converter circuit according to the invention as a function of time.

This operation is also illustrated in FIG. 3.

The curves 300, 302 and 304 respectively show the control voltages U of the switches 13, 17 and 25 as a function of time. It may be recalled that the switch 13 is an NMOS type transistor while the switches 17 and 25 are PMOS type transistors in the present embodiment.

The curve 306 shows the progress of the current at the output terminal 19.

Thus, during the time slot 308, the control voltage of the switches 13, 17 and 25 is at a high level signifying that the NMOS transistor 13 is on, and the inductor 12 gets charged while the PMOS transistors 17 and 25 are in the off state.

Then, during the time slot 310, the control voltage for the switches 13 and 17 is at a low level, signifying that the NMOS transistor 13 is off and the inductor 12 gets discharged through the output circuit 14 (see curve 306) given that the PMOS transistor 25 is supplied with a high-level voltage and is therefore in the off state. The duration of this time slot 310 depends on whether the output voltage is included in the range of setting. It therefore depends on the energy produced by the source and the current consumed by the load 25.

When the output voltage is outside the range of output voltage settings and the output voltage of the switch NMOS is still at a low level, hence in the off state, the switch 17 passes, during the time slot 312, to the off state while the switch 25 goes to the on state and the inductor now gets discharged to the output circuit 15 to recharge the accumulator 29.

The energy stored in the accumulator 29 is used, for example by the load 31, in traditional fashion, and in case of need by means of the regulator 33 and this use shall not be described in greater detail.

Figure 4:
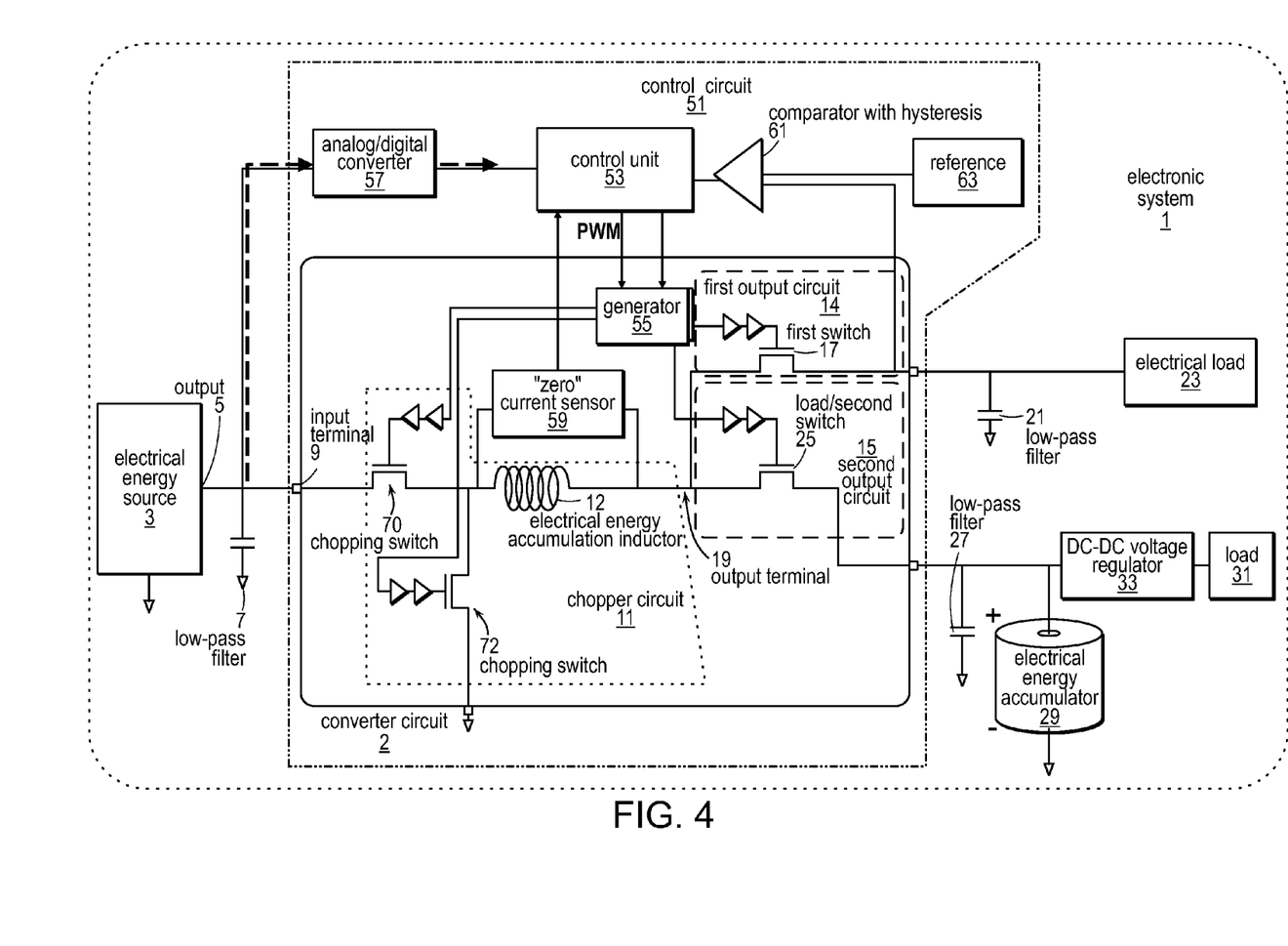
FIG. 4 is a drawing of an electronic system with a convertor circuit according to a second embodiment.

FIG. 4 shows a drawing of a convertor circuit according to the second embodiment.

This drawing differs from that of FIG. 1 in the fact that the switch 13 is eliminated and that the electrical energy accumulation inductor 12 and two chopping switches 70 and 72 controlled by the control circuit of the chopper circuit are placed in a voltage buck configuration.

To describe it in greater detail, the switch 70 is connected to the source 3 and the input of the inductor 12. If the switch 70 is in the on state, it enables a magnetic field to be set up about the inductor 12. The chopping frequency is for example at 200 kHz.

The switches 70, 17 and 25 work similarly, as in the case of the converter circuit of FIG. 1, both for maximum power point tracking and for the directing of electrical energy to the output circuits 14 and 15.

The switch 72 is used at the start of each chopping period to discharge the inductor 12 completely to ground.

Figure 5:
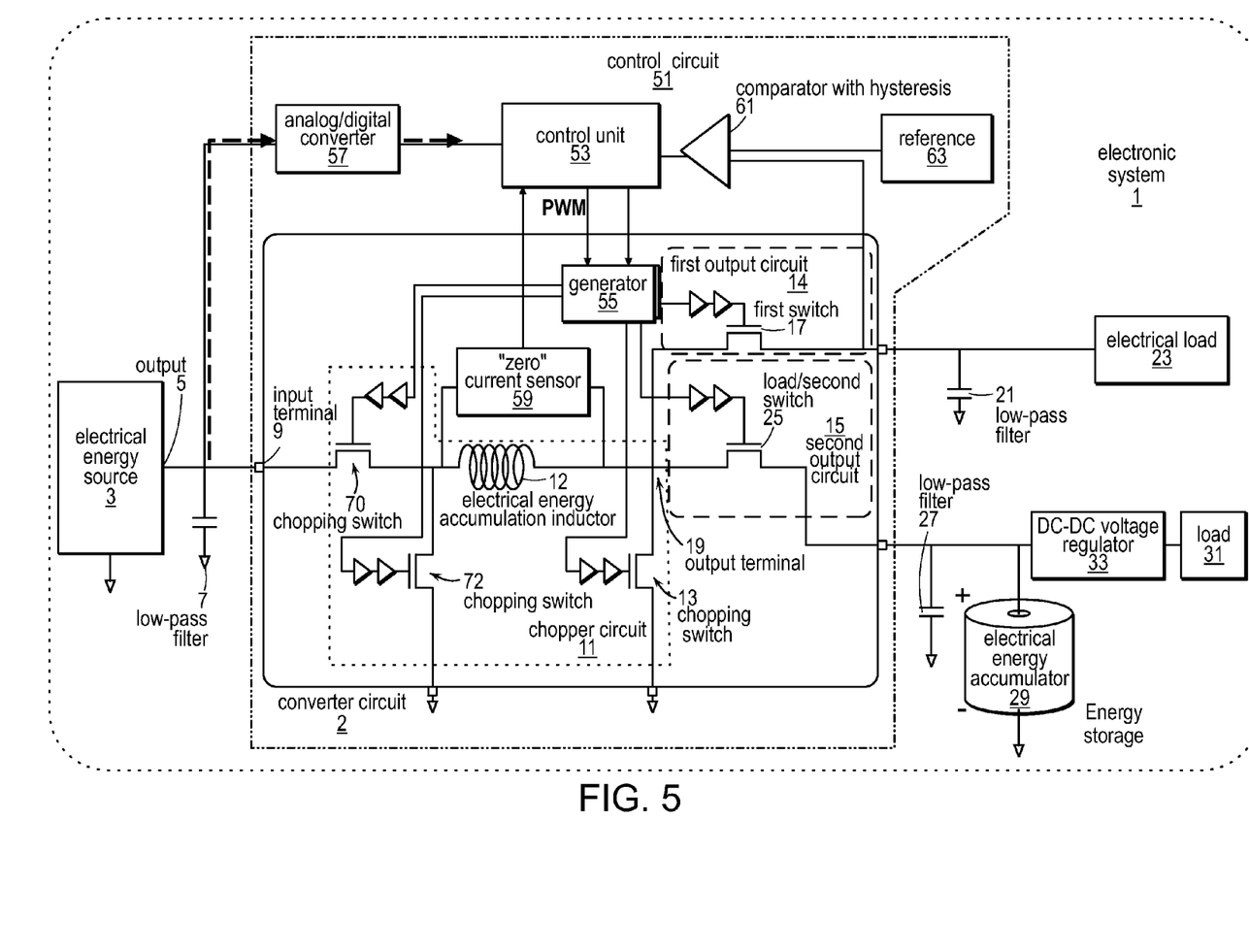
FIG. 5 is a drawing of an electronic system with a converter circuit according to a third embodiment.

FIG. 5 shows a scheme of a converter circuit according to a third embodiment.

This scheme differs from that of FIG. 1 in that the switch 13 is kept and that two chopping switches 70 and 72 of FIG. 4 are added on.

The electrical energy accumulation inductor 12 and the three chopping switches 13, 70 and 72 controlled by the chopper circuit control circuit are laid out in a voltage "buck-boost" configuration.

For a voltage boost operation, the switch 70 is still in the on state and the switch 72 in the off state, the converter circuit 2 working with the switches 13, 17 and 25 as described with reference to FIG. 1.

For a voltage buck operation, the switch 13 is still in the off state, while the converter circuit 2 works with the switches 70, 72, 17 and 25 as described with reference to FIG. 4.

Figure 6:
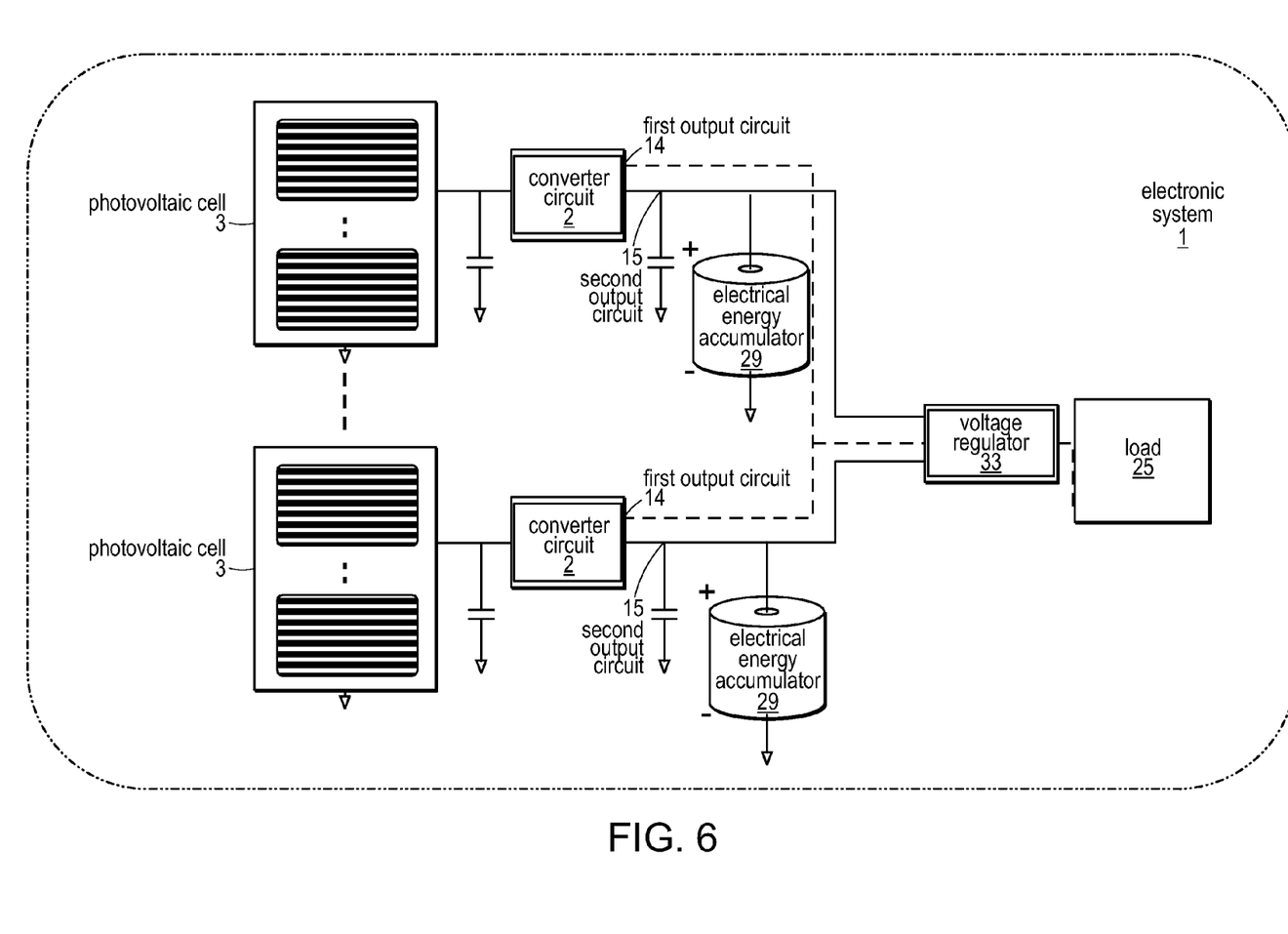
FIG. 6 is a drawing of an electrical system according to another embodiment.

FIG. 6 is a drawing of an electrical system comprising several photovoltaic cells, each of which is associated with a converter circuit 2 like that of FIG. 1 for example.

In this case, the first output circuits 14 are connected together to provide local stabilized power supply and each of the second output circuits 15 of the converter circuits 2 comprises a super-capacitor as well as a DC-DC voltage regulator 33.

Energy harvesting is thus optimized since the cells are made independent of one another, thus preventing a cell which is for example under shadow from becoming a load for the other cells and causing a drop in energy harvesting efficiency.

Furthermore, such an assembly enables each of the cells to work at its maximum power point independently of the other photovoltaic cells.

Finally, when the super-capacitor is sufficiently charged, it can deliver its energy through the regulator 33.

It can therefore be understood that the converter circuit 2 according to the invention optimizes energy harvesting while giving regulated power supply. The circuit will be also distinguished by its simplicity of operation and its low requirements in terms of energy and computation resources.

In particular, for autonomous sensors, it enables the size of the cells/batteries powering the sensor to be smaller when the source gives no energy or does not give sufficient energy.

Having described the invention, and a preferred embodiment thereof, what is claimed as new, and secured by Letters Patent is:

1. A converter circuit to be connected to an electrical energy source capable of major fluctuations, said circuit comprising: a chopper circuit comprising an energy accumulation inductor and at least one chopping switch, and having an input terminal capable of being connected to said electrical energy source, a first output circuit comprising a first switch connected on one side to an output terminal of the chopper circuit, and on the other side to an output terminal of the first output circuit which is connected to a load, a second output circuit comprising a second switch connected on one side to the output terminal of the chopper circuit and on the other side to an output terminal of the second output circuit which is connected to an electrical energy accumulator, wherein said first and second switches are independent, and a control circuit adapted to determine the operating voltage at terminals of said electrical energy source at successive instants, to control the duty cycle of the chopper circuit as a function of the variation in voltage of said electrical energy source, between two successive instants, such that the derivative of the operative voltage as a function of the duty cycle is maximized; the control circuit is further adapted to determine the output voltage on the output terminal of the first circuit, compare the output voltage to a range of output voltage values, and command the first and second switches in order to provide the electrical power either to the load through the first switch, if the output voltage is included in the range, or to the electrical energy accumulator through the second switch if the output voltage is outside the range, wherein said major fluctuations are fluctuations by a factor of 100 between lowest power and highest power provided by said source.

2. The converter circuit of claim 1, wherein the first output circuit is to be connected to an electrical load working in the range of output voltage settings, and wherein the second output circuit is to be connected to an electrical energy accumulator.

3. The converter circuit of claim 2, wherein the control circuit further comprises a comparator with hysteresis, the comparator having one input connected to the first output circuit and an other input connected to a reference, an output of the comparator being connected to an input of a control unit controlling a control generator, two outputs of which are respectively connected to the first and second switches for driving the first and second switches.

4. The converter circuit of claim 2, wherein the electrical energy accumulator comprises a rechargeable micro-battery.

5. The converter circuit of claim 2, wherein the electrical energy accumulator comprises a super-capacitor.

6. The converter circuit of claim 2, wherein the output circuits comprise low-pass filters.

7. The converter circuit of claim 1, wherein the control circuit is further adapted for: determining the voltage at the outputs of said electrical energy source for two different duty cycles of a predefined quantity, computing the difference between the voltages obtained for two different duty cycles of a predefined quantity, comparing the difference in voltage with a previously obtained value of voltage difference, and activating a change in the duty cycle by a quantity predefined as a function of the result of comparison.

8. The converter circuit of claim 7, wherein the control circuit is configured to increase the duty cycle by a predefined quantity if a previous decrease in the duty cycle has resulted in a decrease in the difference in voltage relative to that obtained during a preceding determining operation.

9. The converter circuit of claim 7, wherein the control circuit is configured to decrease the duty cycle by a predefined quantity if a previous increase in the duty cycle has resulted in a decrease in the difference in voltage relative to that obtained during a preceding determining operation.

10. The converter circuit of claim 1, wherein the chopper circuit comprises an electrical energy accumulation inductor and at least one chopping switch controlled by the control circuit.

11. The converter circuit of claim 10, wherein the electrical energy accumulation inductor and the chopping switch are in a voltage boost configuration.

12. The converter circuit of claim 10, wherein the electrical energy accumulation inductor and the chopping switch are in a voltage buck configuration.

13. The converter circuit of claim 10, wherein the electrical energy accumulation inductor and three chopping switches are in a voltage buck/boost configuration.

14. The converter circuit of claim 10, wherein the control circuit comprises a sensor for sensing current of the electrical energy accumulation inductor to trigger the control of at least one switch.

15. An electronic system comprising an electrical energy source capable of major fluctuations, wherein said major fluctuations are fluctuations by a factor of 100 between lowest power and highest power provided by said source, and a converter circuit connected to said electrical energy source, said converter circuit including a chopper circuit comprising an energy accumulation inductor and at least one chopping switch, and having an input terminal connected to said electrical energy source, a first output circuit comprising a first switch connected on one side to an output terminal of the chopper circuit and connected on the other side to a load, a second output circuit comprising a second switch connected on one side to the output terminal of the chopper circuit, and connected on the other side to an electrical energy accumulator, wherein said first and second switches are independent, and a control circuit adapted to determine the operating voltage at terminals of said electrical energy source at successive instants, to control the duty cycle of the chopper circuit as a function of the variation in voltage of said electrical energy source, between two successive instants, such that the derivative of the operative voltage as a function of the duty cycle is maximized; the control circuit is further adapted to determine the output voltage on the output terminal of the first circuit, compare the output voltage to a range of output voltage values, and command first and second switches in order to provide the electrical power either to the load through the first switch, if the output voltage is included in the range, or to the electrical energy accumulator through the second if the output voltage is outside the range.

16. The electronic system of claim 15, wherein said electrical energy source comprises at least one photovoltaic cell.

17. The electronic system of claim 15, wherein said electrical energy source comprises at least one wind-power generator.

18. The electronic system of claim 15, wherein said electrical energy source comprises at least one thermo-electrical element.

19. The electronic system of claim 15, further comprising a plurality of electrical energy sources, each of which is connected to an input of an associated converter circuit, and wherein each of the second output circuits of the converter circuits include a super-capacitor.

20. A converter circuit to be connected to an electrical energy source capable of major fluctuations, wherein said major fluctuations are fluctuations by a factor of 100 between lowest power and highest power provided by said source, said circuit comprising:
 a chopper circuit comprising an energy accumulation inductor and at least one chopping switch, and having an input terminal capable of being connected to said electrical energy source,
 a first output circuit comprising a first switch connected on one side to an output terminal of the chopper circuit, and on the other side to an output terminal of first circuit to be connected to a load,
 a second output circuit comprising a second switch connected on one side to the output terminal of the chopper circuit, and connected on the other side to an electrical energy accumulator, wherein said first and second switches are independent and,
 a control circuit adapted to:
 determine the operating voltage at terminals of said electrical energy source at successive instants and control the duty cycle of the chopper circuit as a function of the variation in voltage of said electrical energy source between two successive instants, such that the derivative of the operative voltage as a function of the duty cycle is maximized.

21. An electronic system comprising an electrical energy source capable of major fluctuations, wherein said major fluctuations are fluctuations by a factor of 100 between lowest power and highest power provided by said source, and a converter circuit connected to said electrical energy source, said converter circuit including:
- a chopper circuit comprising an energy accumulation inductor and at least one chopping switch, and having an input terminal capable of being connected to said electrical energy source,
- a first output circuit comprising a first switch connected on one side to an output terminal of the chopper circuit, and on the other side to an output terminal of first circuit to be connected to a load,
- a second output circuit comprising a second switch connected on one side to the output terminal of the chopper circuit, and connected on the other side to an electrical energy accumulator, wherein said first and second switches are independent and,
- a control circuit adapted to:
- determine the operating voltage at terminals of said electrical energy source at successive instants and control the duty cycle of the chopper circuit as a function of the variation in voltage of said electrical energy source between two successive instants, such that the derivative of the operative voltage as a function of the duty cycle is maximized.

* * * * *